United States Patent
Morgan

[11] 3,747,138
[45] July 24, 1973

[54] HYDROFOIL SURFBOARDS

[76] Inventor: Daniel Ruben Morgan, P.O. Box 8286, Aiea, Hawaii 96815

[22] Filed: Oct. 26, 1970

[21] Appl. No.: 83,993

[52] U.S. Cl. ............................ 9/310 E, 114/66.5 H
[51] Int. Cl. ............................................ A63c 15/00
[58] Field of Search ............ 9/310 E, 310 A, 310 R; 114/66.5 H

[56] References Cited
UNITED STATES PATENTS

| | | | |
|---|---|---|---|
| 2,751,612 | 6/1956 | Shepard | 9/310 B |
| 3,121,890 | 2/1964 | Rumsey, Jr. | 114/66.5 H X |
| 3,164,119 | 12/1965 | Emmanuel | 114/66.5 H |
| 3,182,341 | 5/1965 | Rieffle | 9/310 C |
| 3,200,421 | 8/1965 | Willians | 9/310 E |
| 3,564,632 | 2/1971 | Bahne, Jr. | 9/310 E |
| 3,579,681 | 5/1971 | Pope | 9/310 E |
| 3,604,031 | 9/1971 | Cahill | 9/310 C |
| 2,355,302 | 8/1944 | Kirchner | 9/310 E |

Primary Examiner—Milton Buchler
Assistant Examiner—Paul E. Sauberer
Attorney—James C. Wray

[57] ABSTRACT

A wave riding, wave-propelled free body surfboard when underway along the surface of a wave is supported above the wave by hydrofoils having sufficient area, angle of attack and lift to support at least a portion of the surfboard above a surface of the water.

The force diagram shown below is a diagram coplanar with the wave surface.

$$R_s^2 = W_s^2 + B_s^2 - 2(W_s)(B_s)\cos A$$

1.

Where:
$W_s$ is magnitude and direction of wave face speed
$B_s$ is magnitude and direction of surfboard speed
$R_s$ is magnitude and direction of resultant flow of water across bottom of surfboard;
and
A is angle between $W_s$ and $B_s$ $$\text{Area} = \text{Lift}/(\text{Speed}^2 \times Cl \times p/2)$$

2.

Where,
Area is total projected area of hydrofoils
Lift is combined weight of surfboard and rider
Speed is relative speed between surfboard and water
Cl is lift coefficient of given wing section at given angle of attack
and
p is the mass density of water

TABLE 1

| Wave height in feet | Average Maximum Speed in miles per hour | |
|---|---|---|
| | Conventional | Hydrofoil |
| 10 | 20 | 25 |
| 20 | 25 | 30 |
| 30 | 28 | 35 |

12 Claims, 13 Drawing Figures

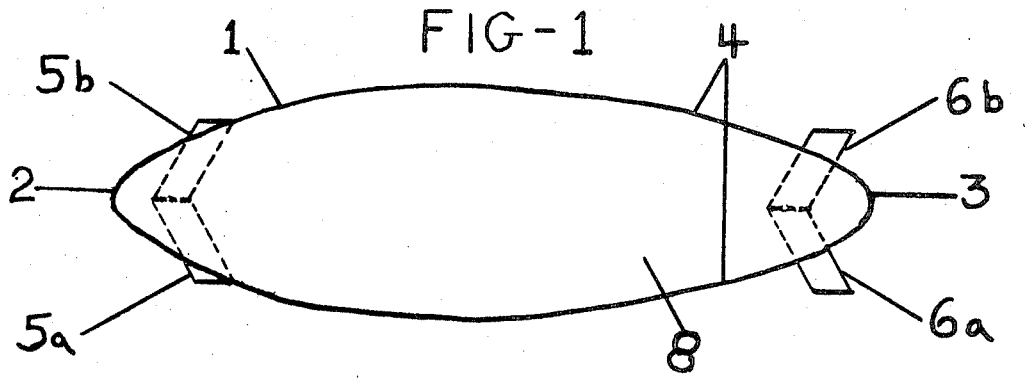
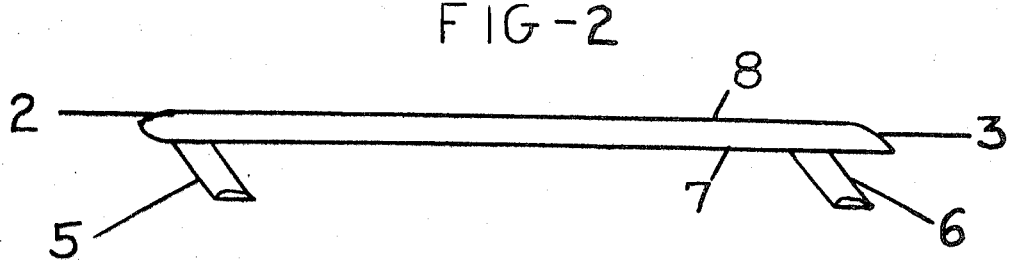
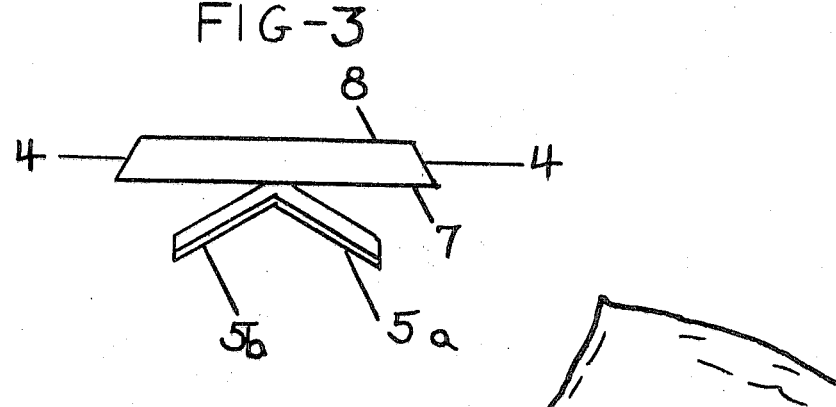
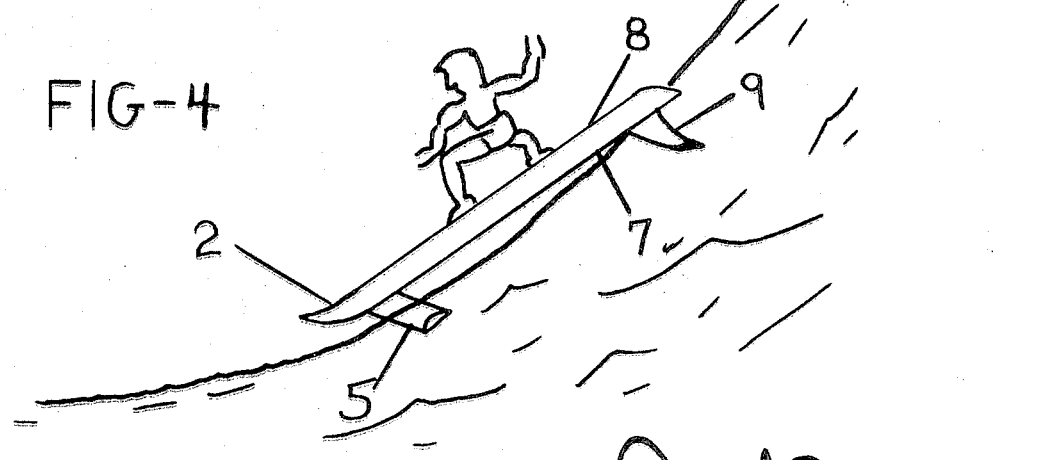

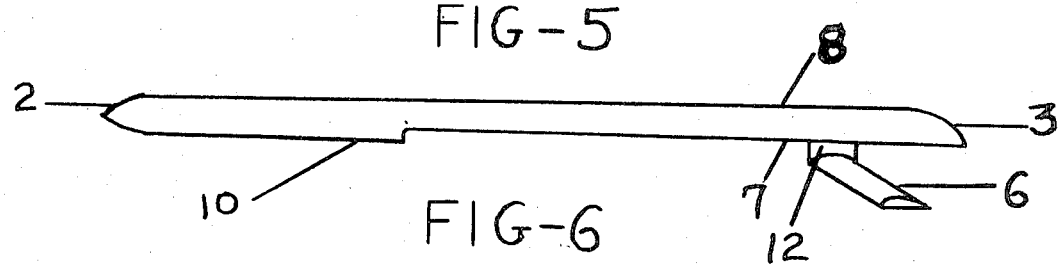
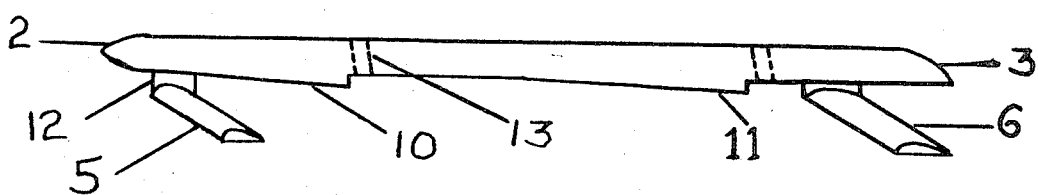
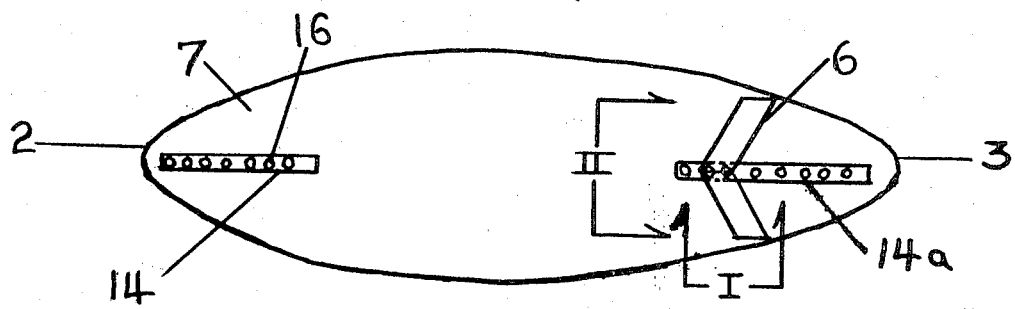
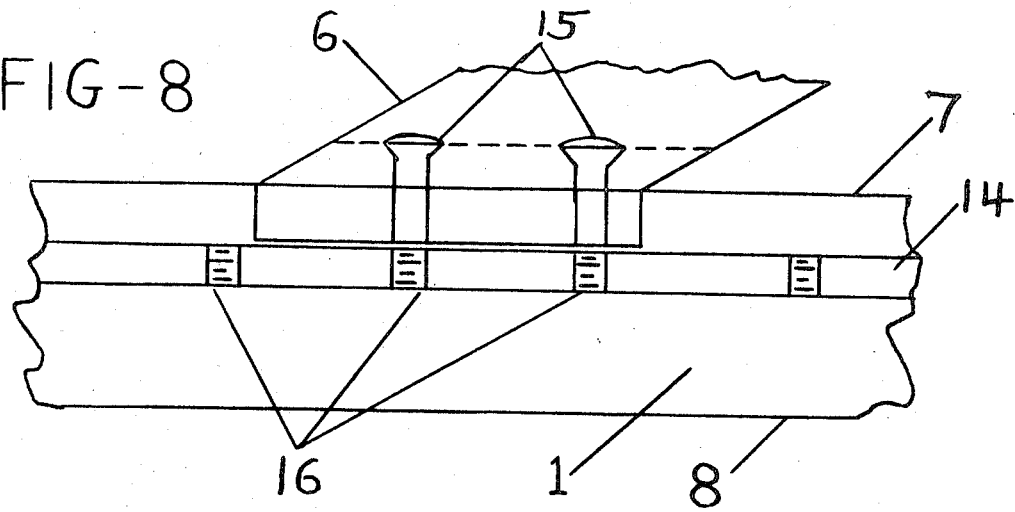

HYDROFOIL SURFBOARDS

My invention relates to water sports devices, and in particular, to surfboards equipped with lifting hydrofoils for the purpose of lifting the whole board, or portions thereof, out of the water while the surfboard is in motion with the rider upon it.

The function of such a surfboard is to enable the rider, with the aid of gravity only, to maneuver freely upon the face of water waves, typically ocean waves. This is the surfboarding descended directly from the ancient Hawaiian sport of wave-riding.

All previous patents have been granted to hydrofoil equipped vehicles which, by nature, are required to be towed by another vehicle or contrivance, or require a source of motive power within or upon the vehicle itself. My invention is propelled by gravity only. Otto L. Kuehn, in the specifications of his U.S. Pat. No. 2,815,518 continually refers to his device as "surfboard(s)," however, as is made clear in his claims, he is referring to "a towable water vehicle," and is hence, not related to the freely skimming sport of wave riding. Other patents such as towable water skis and powered hydrofoil hulls do not apply either.

Therefore, let us define "surfboard" as used in this text as "wave riding vehicles" which allow the rider thereupon to maneuver freely upon the forward face of water waves, such water waves typically taking the form of ocean waves of translation. Such a wave riding vehicle has no means of motive power, other than that of gravity assisting the surfboard to slide down the incline presented by the wave face.

All present surfboarding equipment has heretofore been limited to the planing effect produced as the relatively flat bottom of the surfboard passes over the surface of the water generating hydrodynamic planing lift. However, once surfboard is in planing condition, wetted surface area of board is generally greater than the minimum area required to lift the combined weight of rider and surfboard out of water and maintain planing condition. Hence, by adapting hydrofoils to such a wave riding planing hull, I am able to reduce the wetted surface area to a minimum, and obtain all the benefits inherent and attendant to lifting hydrofoils.

In the drawings, wherein like reference numerals denote corresponding parts throughout the several views;

FIG. 1 illustrates a top plan view of a surfboard improved with lifting hydrofoils;

FIG. 2 is a side view of surfboard in FIG. 1;

FIG. 3 is a front end view of surfboard in FIG. 1;

FIG. 4 is a side view of a surfboard with hydrofoil at the front only, and with conventional stabilizing fin at the rear, while in flight upon a wave;

FIG. 5 is a side view of surfboard with hydrofoil at the rear, and a plain Ramus step at front of board;

FIG. 6 is a side view of surfboard with both front and rear hydrofoils, and front and rear ventilated Ramus steps;

FIG. 7 is a bottom plan view of a surfboard with channels along which hydrofoil's position may be varied;

FIG. 8 is a section view of FIG. 7 taken along section lines I;

Figure 9:
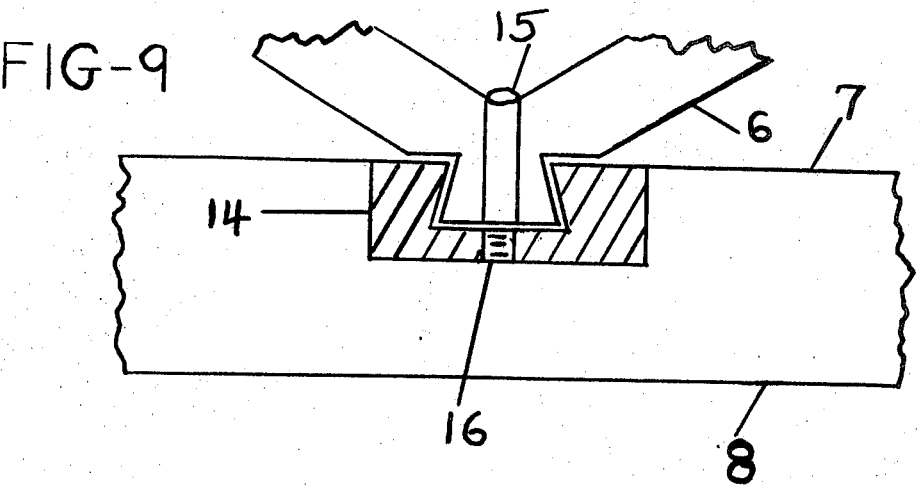
FIG. 9 is a section view of FIG. 7 taken along section lines II.

The main purposes of my adapting lifting hydrofoils to surfboards are:

1. Lift surfboard completely out of water, excluding hydrofoils;
2. Reduce power required for a given speed, or conversely allow greater speed from a given power;
3. Increase lift at selected points on surfboard, to help prevent those points from submerging.

The results and advantages of the above named purposes are, respectively:

1. Wetted surface area of board is reduced, thereby reducing drag. Hence, viscous drag is reduced, laminar flow drag is reduced; turbulent flow drag is reduced; outline form drag is reduced; rail form 4 in FIG. 3, drag is reduced; bottom 7, form drag is reduced; wave chop drag is reduced; Coanda effect is reduced; wave making drag is reduced; spray making drag is reduced; water-release-edge drag is reduced; fin 9 in FIG. 4 drag is reduced as fin may be made smaller as foils generate lateral stability. Also, finish of surfboard is less important since it is not in contact with water when in flight; buoyancy of foils themselves allow reduced bouyancy of board body 1. Further, positions of and types of foils may be varied by the individual to produce varying effects on handling performance of board, and concurrently, bottom 7, of board 1, may have fittings and devices, as in FIGS. 7,8,& 9, for attaching hydrofoils 5 & 6, to bottom of surfboard 1. All the above advantages permit new methods of surfboard construction and design possible.

2. For a given inclination of wave face, therefore, greater speed is made possible, thereby enabling the rider of such a hydrofoil surfboard to travel across the face of the wave at a greater speed; allowing him to escape the curling or breaking portion of waves heretofore unbeatable with the slower conventional planing surfboards. This increased speed will give the rider new sensations and will allow him a greater margin of error when executing high-performance manuvers.

3. Curvature of the surfboard at the forward tip 2, commonly referred to as "scoop" is unnecessary, since hydrofoils may be utilized to keep nose 2, out of the water as is shown in FIG. 4. When using a surface piercing hydrofoil 5 as in FIG. 4, the greater the tendency of the nose 2 to submerge itself, the more deeply will the hydrofoil 5 be submerged, and hence, more lift is generated to counteract initial tendency. Therefore, nose form need not be so complex as "scoop" is unnecessary; pearling tendency (nose submerging into water) is attenuated; curvature drag of scoop is non-existent; surfboard may be made shorter (chop off scoop). Also, nose 2 directional stability is increased particularly when riding surfboard in "white water" (broken portion of wave), and with the nose area out of water, as shown in FIG. 4, drag is reduced.

FIG. 1 illustrates one possible arrangement of lifting hydrofoils 5 and 6 attached to bottom 7 of surfboard 1. One hydrofoil 5 is located near the front end or nose 2, and the other is located near the rear end or tail 3. Rider supports himself upon top surface 8, as is shown in FIG. 4. FIG. 2 and FIG. 3 show side and front views of surfboard in FIG. 1, respectively. 5a and 5b are arbitrary designations for wings of surface piercing hydrofoil 5. Hydrofoils 5 and 6 are symmetrical and are located on the center line of the surfboard running from nose 2 to tail 3. Each wing, such as 5a and 5b in FIG. 3 is inclined at an angle of approximately 22° with respect to the bottom 7 of the surfboard as shown in FIG. 3. Each wing of each hydrofoil presents a positive angle of attack when water flow is parallel to bottom 7 from nose to tail. Such a positive angle of attack is clearly shown in FIG. 3. Each wing of each hydrofoil is swept back towards the tail 3 at an angle of approximately 30° to 45° with respect to a normal transverse plane intersecting bottom 7. The reason for the backwardly swept wings is that when board is traveling at other than directly down face of wave, i.e., at other than perpendicular to wave's direction of travel, there is a sidewise flow component across bottom of board. Such a side flow is caused by the wave face direction of travel, and the resultant flow is therefore not parallel to the longitudinal axis of the board. The magnitude and direction of the resultant flow may be found via Equation (1) in the Abstract of the Disclosure. Therefore, the hydrofoils shown in FIGS. 1 through 13, will not only show a positive angle of attack, but will also present a maximum cross sectional area to the resultant flow thus deflected from the long axis of the surfboard. The wings on the side of the surfboard upon which the lateral flow first impinges will be giving a high degree of lift, while the wings on the side of the surfboard from which the flow leaves the surfboard will be giving a lesser degree of lift and may actually be in a planing condition as the flow passes along the relatively flat bottom of those wings. For this reason, wing sections with high lift coefficients at large positive angles of attack are desirable. Standard NACA airfoil sections may be used for this purpose.

If surface piercing hydrofoils are used, whose tips have their apex, if extended downwardly, on the normal plane bisecting the surfboard from nose 2 to tail 3, then forwardly swept wings will be required.

The size and shape of the hydrofoil wings required for a given minimum flight speed may be found via Equation (2) in the Abstract of the Disclosure.

The average maximum possible speeds obtainable with both hydrofoil equipped surfboards and conventional planing surfboards is given in Table (1) of the Abstract of the Disclosure.

The foils 5 and 6 may be made of any suitable non-corrosive material, preferably buoyant, such as wood, plastic, or polyurethane foams covered with resin impregnated glass cloth, as is standard in conventional surfboard construction practice today. FIGS. 1 through 13 show surface piercing foils, though fully submerged types may be used in conjunction with the surface piercing types. The same foil may have both a surface piercing part and a fully submerged part. Ladder types of hydrofoils may be used also, though strut arrangement required usually increases drag.

Since hydrofoils near the nose restrict lateral movement and resists lateral water flow inherent in the turning manuver, a rider demanding high manuverability may prefer to use a surfboard equipped only with a rear hydrofoil 6, and with a Ramus step 10 in the front half of the board as shown in FIG. 5. The step may be of plain or ventilated type, the latter having holes 13, approximately one-fourth inch in diameter extending vertically through board to top 8, as shown in FIG. 6. The step will perform the same function as that on a seaplane float, in that it will reduce the wetted area of surfboard as it attains speed. Another method of combining steps and hydrofoils is shown in FIG. 6, in which the forward step 10 assists the forward hydrofoil 5 in obtaining flight condition and breaking bottom 7, free from water; the rear step 11 does the same for the rear hydrofoil 6.

Transition to flight condition from planing condition may also be assisted by rider causing board to porpoise, i.e., by weighting and unweighting his body weight upon the surboard's top surface 8.

FIG. 7 show one possible method by which rider may vary type, size and position of hydrofoils on bottom of board. FIG. 7 shows a bottom plan view of board with dovetail channels into which foil's root, base, or strut is inserted, such channels 14, having tapped holes 16, into which a suitable non-corrosive screw may be inserted to secure foils rigidly to surfboard. Channel itself 14, may be made of molded plastic, and imbedded flush with bottom surface 7 of surfboard.

FIG. 8 is a section view of FIG. 7 taken along section lines I, and shows the details of channel 14, and hydrofoil 6, which has countersunk holes 15, through which countersunk screws may pass freely to engage in tapped holes 16 of channel 14.

FIG. 9 is a section view of FIG. 7 taken along section lines II and further illustrates method of fastening foil 6 to channel 14. Dove-tail shape of channel is clearly seen in this view.

Channel 14 may have a wide spot, such that foils may be inserted and removed freely, in order that foils differing as to type, chord, taper, outline shape, section shape, aspect ratio, and particularly area may be interchangeably fixed to bottom of board. Simply by varying area of foils, you may adjust for minimum flight speed or for different weights of different riders of same board.

Foils may be fastened directly to board bottom 7 as shown in FIG. 3, or may be extended from the bottom via strut 12 as shown in FIG. 5.

Figure 10:
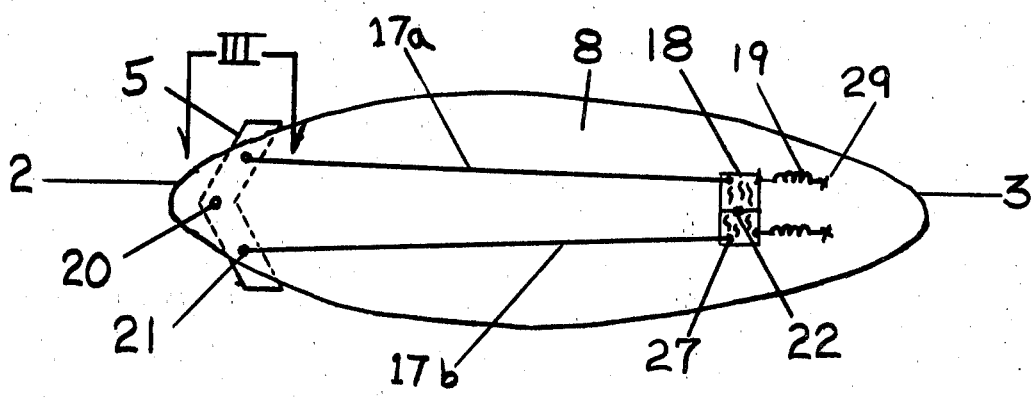
FIG. 10 is a top plan view of surfboard with steerable nose hydrofoil.

As stated previously, individual riders may prefer a higher degree of manuverability than that offered by fixed hydrofoils, and rather than substitute a Ramus step for a lifting hydrofoil in the front of the board as shown in FIG. 5, a steerable nose hydrofoil 5 may be provided as shown in FIG. 10. FIG. 10 is a top plan view showing steerable nose foil 5, and control rods 17a and 17b which are within board body 1, and steering pedal 18, which is only slightly raised above top 8 of surfboard. Steerable nose foil 5 pivots about point 20 and steering pedal pivots about point 22. Springs 19 return pedal 18 to neutral position when pressure is released, and the free ends of which are securely fastened to board body at points 29. Rods 17 are recessed into channels 28.

Figure 11:
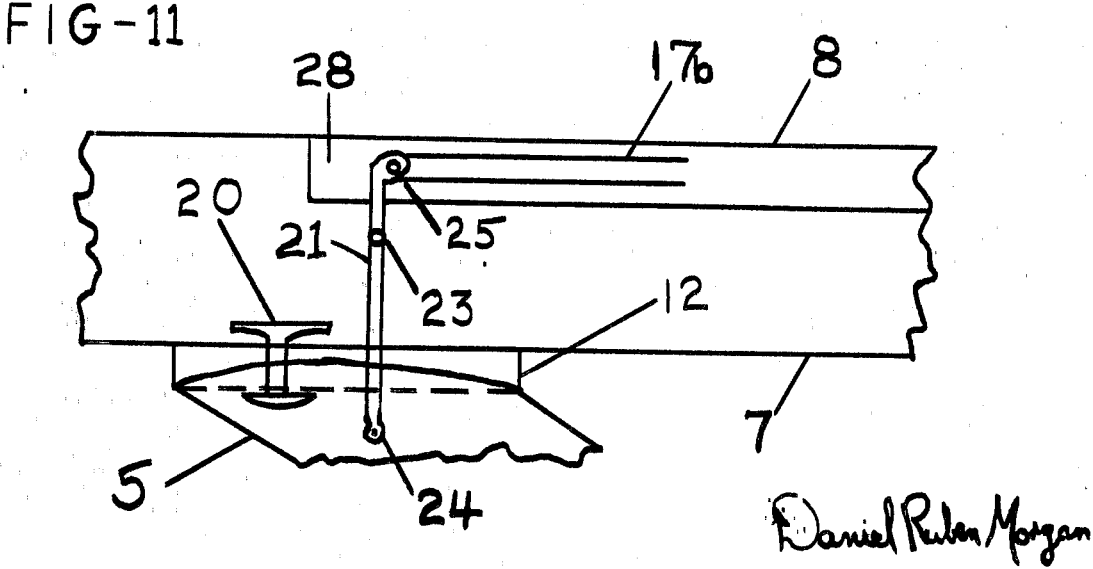
FIG. 11 is a section view of FIG. 10 taken 180° to section lines III.

FIG. 11 is a section view of FIG. 10 taken 180 degrees to section lines III and shows details of control lever 21 which pivots about point 23. Control rods 17 are secured to control lever 21 at point 25, which is a swivel joint. other end of control rod is connected to pedal 18 at point 27 as shown in FIG. 10 and is also a swivel joint. Control lever is connected to hydrofoil wings at points 24, which is also a swivel joint. Hydrofoil 5 has a pivot which is securely imbedded at point 20. Hydrofoil moves freely on this pivot.

The nature of such a steerable system is such that when rider is facing nose 2 of surfboard while riding, then by pivoting pedal 18 in a clockwise direction with his rear foot, the board will turn right; by pivoting pedal 18 in a counter-clockwise direction, the board will turn left. When sliding down wave face at an angle, rider may also turn nose foil 5 at an angle to compensate for resultant lateral flow mentioned previously, and thereby obtain maximum lift.

Though symmetrical arrangements are pleasing to the eye, I have found that assymmetrical placement of hydrofoil wings seem to reduce drag and increase lift. The drag appears to be channel drag associated with the channel of water captured between the two wings at any given moment, and the increased lift may be accounted for by reducing interference induced by the relatively close proximity of the two wings of a given hydrofoil.

Figure 12:
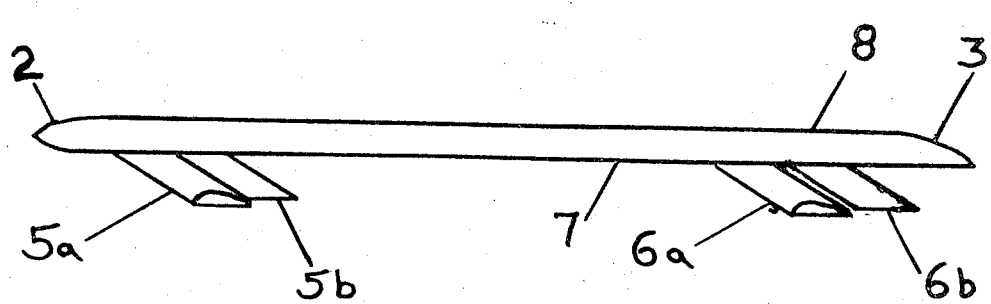
FIG. 12 is a side view of a surfboard equipped with assymetrical hydrofoils.
Figure 13:
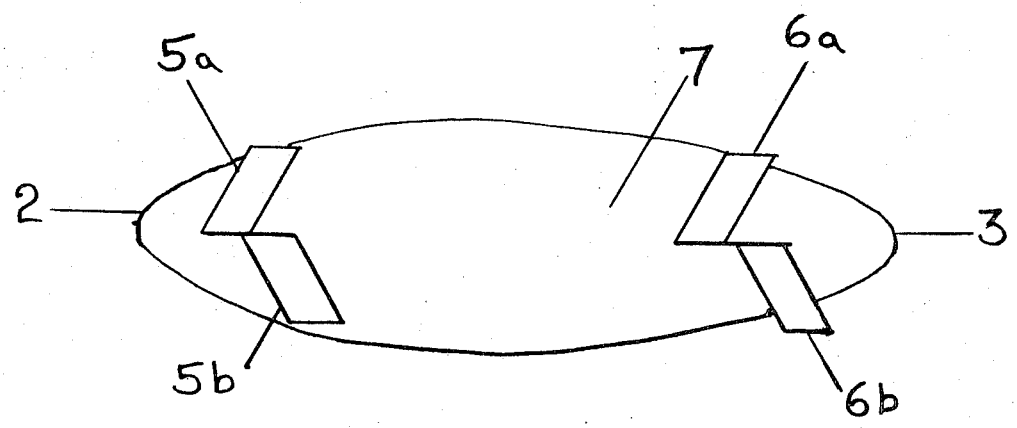
FIG. 13 is a bottom plan view of surfboard illustrated in FIG. 12.

Therefore, FIG. 12 shows a side view of such an assymmetrical arrangement of hydrofoil wings, and FIG. 13 shows a bottom plan view of the surfboard depicted in FIG. 12. Each wing of a given hydrofoil is displaced along the long axis of the surfboard. The displacement should not exceed much more than one chord length. In FIG. 12 and 13, wings 5a and 5b are displaced less than one chord length; wings 6a and 6b are displaced slightly more than one chord length.

Although I have disclosed herein the best forms of the invention known to me at this time, it should be understood, of course, that many modifications may be made, and it is therefore contemplated to cover by the appended claims any such modifications as fall within the true spirit and scope of the invention.

What I claim as my invention and desire to secure by Letters Patent:

1. A wave-propelled and wave-riding surfboard vehicle, comprising a long, narrow buoyant planing hull, devoid of towing and foot connections, for supporting a rider out of the water, to the bottom of which hull are attached and extend downward therefrom, a plurality of positively lifting hydrofoils having a size, configuration and angle of attack sufficient to lift at least portions of said wave-riding surfboard completely free from the water, so as to allow a rider thereupon to maneuver such wave-riding surfboard upon the forward face of water waves, as gravity induces such a wave-riding surfboard to slide down the incline presented by the wave's face, and thereby to pass swiftly and efficiently over the surface of the water, the hydrofoils having leading and trailing edges angularly swept with respect to an elongated direction of the surfboard, an apex of roots of the hydrofoils falling in a normal plane bisecting the planing hull along a longitudinal axis.

2. A wave riding vehicle or surfboard as claimed in claim 1, which utilizes surface-piercing type hydrofoils which are directly connected to the hull.

3. A wave riding vehicle or surfboard as claimed in claim 1, which utilizes hydrofoils which have one part which is of the fully submerged type, and another part thereof which is of the surface piercing type.

4. A wave riding vehicle or surfboard as claimed in claim 1, which utilizes a hydrofoil assembly at the rear or tail end thereof, and a plain or ventilated type of Ramus step within the forward one-third of said surfboard.

5. A wave riding vehicle or surfboard as defined in claim 1, such that at least one hydrofoil is located within the front one-third of the board, and at least one hydrofoil is located within the rear one-third of said surfboard.

6. The invention as defined in claim 5, with at least one Ramus step located such as to assist the vehicle to attain foil borne operation, with the at least one step running generally transversely across the bottom of the board.

7. A wave riding vehicle or surfboard as claimed in claim 1, such that there being only one hydrofoil assembly, with that one hydrofoil located in the nose area such that the lift produced by that hydrofoil resists any tendency for the nose of the surfboard to submerge.

8. A wave riding vehicle or surfboard as claimed in claim 1, with means for attaching the hydrofoils to the bottom surface of the surfboard, such that the positions of the hydrofoils may be varied along the long axis of said board, and which also allows the interchangeability of different foils, which may vary as to number, size, shape, section, outline form, chord, twist, taper, angle of attack, sweep, type (surface piercing, fully submerged, ladder) and particularly area.

9. A wave riding vehicle or surfboard as claimed in claim 8, such that the aforementioned means for attachment shall consist of a channel or channels imbedded within the body of the surfboard along the longitudinal axis, and being of suitable durable material, with a dove-tail shaped recess running the length of the channel, and with tapped holes spaced periodically and uniformly along the length of such dove-tail recess, with such tapped holes being able to receive a suitable non-corrosive screw which passes freely, excluding head, through the hydrofoil strut or main body and into said tapped holes, to secure the hydrofoils rigidly to the surfboard body, and with the aforementioned channel having a wide spot which allows insertion and removal of such interchangeable hydrofoils.

10. Wave riding vehicle or surfboard as claimed in claim 1, equipped with hydrofoils which have wings in an assymetrical arrangement, such that the wings on each foil assembly are staggered or displaced along the long axis of said surfboard.

11. The wave-propelled surfboard of claim 1 in which the leading and trailing edges of the hydrofoils are swept backwards.

12. The wave-propelled surfboard of claim 1 in which the hydrofoils have leading and trailing edges swept forward.

* * * * *